H. L. McAVOY.
Refrigerator.
No. 12,210.
Patented Jan. 9, 1855.
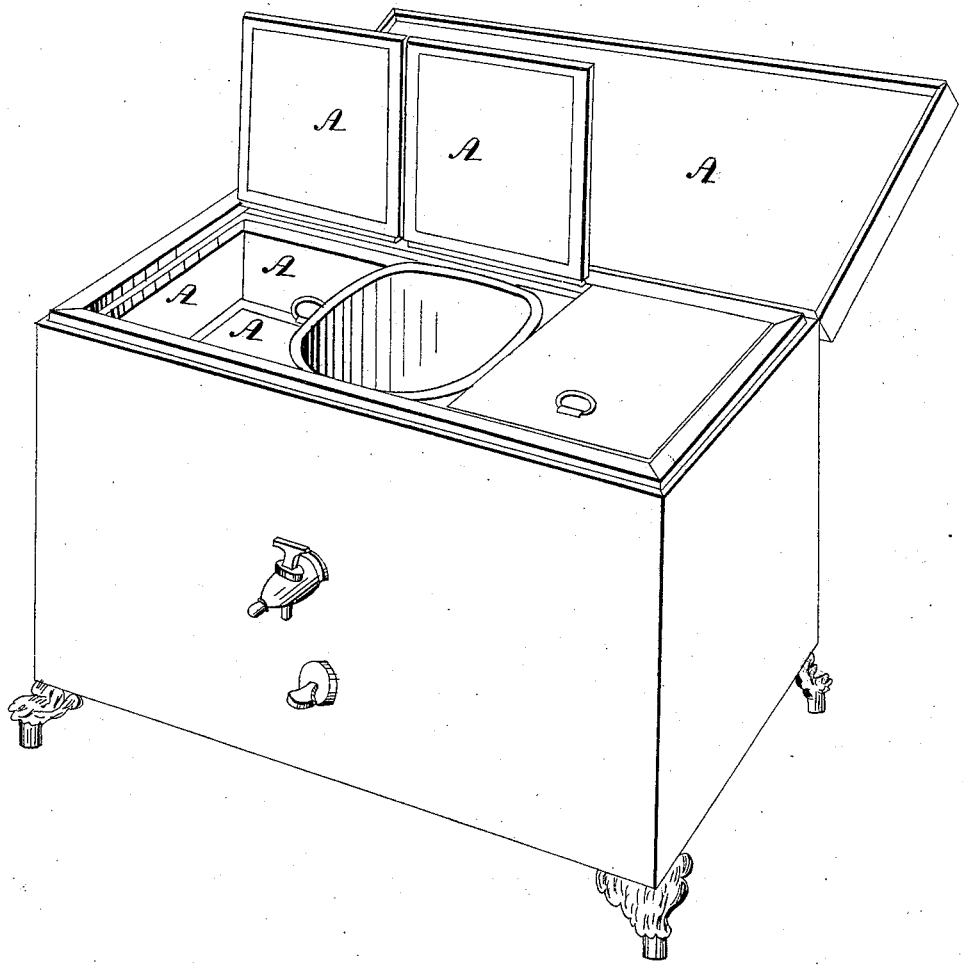

UNITED STATES PATENT OFFICE.

H. L. McAVOY, OF BALTIMORE, MARYLAND.

REFRIGERATOR.

Specification of Letters Patent No. 12,210, dated January 9, 1855.

*To all whom it may concern:*

Be it known that I, HUGH L. McAVOY, of Baltimore city, in the State of Maryland, have discovered a new and important Article in its Application to the Use of a Lining for Refrigerators; and I do hereby declare that the following is a full and exact description thereof, reference being had to the accompanying drawing.

The nature of my discovery, which I shall proceed to describe consists simply in using glass, A, for lining refrigerators instead of any of the materials now used, which are zinc, soapstone, slate, and galvanized iron.

I construct my refrigerators in any of the known forms but I use glass for my lining instead of any of the above named articles now used. The glass is secured in its place, as in the model, by pouring plaster around it, or by any other mode.

The advantages glass possess over all other materials now used for the purposes named, are, first, its incorruptibility; second, its cheapness, compared with other articles now used for the purpose; third, its inability to retain the disagreeable smell peculiar to refrigerators otherwise lined; fourth, its known advantages as a non-conductor of heat; fifth, its beauty and cleanliness as a lining.

What I claim as my discovery, and desire to secure by Letters Patent is—

The application of glass to the purpose of lining refrigerators; I claim glass in any form or thickness, enameled porcelain, or anything substantially the same.

HUGH L. McAVOY.

Witnesses:
WM. H. HAYWARD,
C. C. DUNN,
JOHN RYAN.